(12) United States Patent
Xu et al.

(10) Patent No.: US 7,792,152 B1
(45) Date of Patent: Sep. 7, 2010

(54) SCHEME FOR TRANSMITTING VIDEO AND AUDIO DATA OF VARIABLE FORMATS OVER A SERIAL LINK OF A FIXED DATA RATE

(75) Inventors: Mingcheng Xu, Simi Valley, CA (US); Shing-Wu Tzeng, Fountain Valley, CA (US)

(73) Assignee: OWLink Technology, Inc., Tustin, CA (US)

( * ) Notice: Subject to any disclaimer, the term of this patent is extended or adjusted under 35 U.S.C. 154(b) by 1815 days.

(21) Appl. No.: 10/864,755

(22) Filed: Jun. 8, 2004

(51) Int. Cl.
| | |
|---|---|
| H04J 3/06 | (2006.01) |
| H04L 12/28 | (2006.01) |
| H04L 12/56 | (2006.01) |
| H04L 5/00 | (2006.01) |
| H04L 7/00 | (2006.01) |
| H04N 7/12 | (2006.01) |
| H04N 11/02 | (2006.01) |
| H04N 11/04 | (2006.01) |
| H04N 7/16 | (2006.01) |
| G06F 1/12 | (2006.01) |
| G06F 13/42 | (2006.01) |

(52) U.S. Cl. .............. 370/503; 370/395.62; 375/240.28; 348/423.1; 713/400; 725/151
(58) Field of Classification Search ............ 370/395.62
See application file for complete search history.

(56) References Cited

U.S. PATENT DOCUMENTS

| | | | |
|---|---|---|---|
| 4,241,456 A | | 12/1980 | Nakagaki et al. |
| 5,140,419 A | | 8/1992 | Galumbeck et al. |
| 5,237,610 A | | 8/1993 | Gammie et al. |
| 5,481,543 A | | 1/1996 | Veltman |
| 5,502,837 A | * | 3/1996 | Hoffert ....................... 713/400 |
| 5,835,498 A | | 11/1998 | Kim et al. |
| 5,864,682 A | * | 1/1999 | Porter et al. ................. 709/247 |
| 6,018,765 A | | 1/2000 | Durana et al. |
| 6,130,625 A | | 10/2000 | Harvey |

(Continued)

FOREIGN PATENT DOCUMENTS

EP          0734126 A1      9/1996

(Continued)

OTHER PUBLICATIONS

Sotiropoulos, S., "Transmission and Multiplexing of Uncompressed Video and Ancillary Signals Over a New Multimedia Frame." Department of Electrical Engineering and Electronics, University of Manchester Institute of Science and Technology (UMIST), Jun. 11, 2001, IEEE, pp. 753-759.

*Primary Examiner*—William Trost, IV
*Assistant Examiner*—Andrew Chriss
(74) *Attorney, Agent, or Firm*—Fenwick & West LLP

(57) ABSTRACT

A flexible framing format and implementation scheme for transmitting uncompressed video data selected from a group of various video formats, audio data and control data over a single serial communication channel at a fixed clock rate, thereby eliminating the need for transmitting a pixel clock signal. The data is transmitted over the single communication channel in packets and recreated at the destination side. Blank pixels of the video data are completely suppressed so that only active pixels are transmitted over the single communication channel, thereby reducing communication bandwidth requirement of the channel.

30 Claims, 6 Drawing Sheets

U.S. PATENT DOCUMENTS

| | | | |
|---|---|---|---|
| 6,151,334 A | 11/2000 | Kim et al. | |
| 6,229,859 B1 | 5/2001 | Jeong et al. | |
| 6,323,854 B1 | 11/2001 | Knox et al. | |
| 6,333,750 B1* | 12/2001 | Odryna et al. | 345/629 |
| 6,463,092 B1 | 10/2002 | Kim et al. | |
| 6,483,503 B1* | 11/2002 | Spannaus et al. | 345/213 |
| 6,527,534 B1 | 3/2003 | Kamiguchi et al. | |
| 6,564,269 B1 | 5/2003 | Martin | |
| 6,577,324 B1 | 6/2003 | Palmer et al. | |
| 6,587,525 B2 | 7/2003 | Jeong et al. | |
| 6,738,417 B1 | 5/2004 | Kim et al. | |
| 7,088,398 B1* | 8/2006 | Wolf et al. | 348/423.1 |
| 2001/0000826 A1 | 5/2001 | Bellamy | |
| 2001/0001564 A1 | 5/2001 | Smyers | |
| 2002/0112242 A1* | 8/2002 | Meddaugh et al. | 725/78 |
| 2002/0118296 A1 | 8/2002 | Schwab et al. | |
| 2003/0063601 A1* | 4/2003 | Niida et al. | 370/360 |
| 2003/0076558 A1* | 4/2003 | Raman et al. | 359/119 |
| 2003/0138102 A1* | 7/2003 | Kohn et al. | 380/213 |
| 2003/0147650 A1 | 8/2003 | Hwang et al. | |
| 2004/0001564 A1 | 1/2004 | Chan et al. | |
| 2004/0047593 A1* | 3/2004 | Ota | 386/46 |
| 2004/0080671 A1* | 4/2004 | Siemens et al. | 348/473 |
| 2004/0086000 A1 | 5/2004 | Wallace et al. | |
| 2006/0062338 A1 | 3/2006 | Chua | |
| 2006/0067690 A1 | 3/2006 | Tatum et al. | |
| 2006/0095943 A1 | 5/2006 | Demircin et al. | |
| 2006/0209892 A1 | 9/2006 | MacMullan et al. | |
| 2006/0210278 A1 | 9/2006 | Cregg et al. | |
| 2007/0019958 A1 | 1/2007 | Calhoon | |

FOREIGN PATENT DOCUMENTS

| | | |
|---|---|---|
| EP | 0820612 B1 | 9/2002 |
| EP | 0853852 B1 | 2/2003 |
| EP | 0897625 B1 | 9/2003 |
| EP | 0690630 B1 | 5/2004 |
| EP | 0890244 B1 | 5/2004 |
| EP | 1416687 A1 | 5/2004 |
| WO | WO 97/13348 | 4/1997 |
| WO | WO 99/12306 | 3/1999 |
| WO | WO 99/12316 | 3/1999 |
| WO | WO 99/38281 | 7/1999 |
| WO | WO 99/63698 | 12/1999 |
| WO | WO 00/14626 | 3/2000 |
| WO | WO 00/16302 | 3/2000 |
| WO | WO 00/16525 | 3/2000 |
| WO | WO 00/60795 | 10/2000 |
| WO | WO 02/39683 A2 | 5/2002 |
| WO | WO 02/103917 A2 | 12/2002 |
| WO | WO 03/024067 A1 | 3/2003 |
| WO | WO 03/058376 A2 | 7/2003 |
| WO | WO 03/058826 A1 | 7/2003 |
| WO | WO 03/058946 A2 | 7/2003 |

* cited by examiner

| Byte | Content | Comments | |
|---|---|---|---|
| I1 | Idle Pattern 1 | Idle Patterns | 310 |
| I2 | Idle Pattern 2 | | |
| I3 | Idle Pattern 3 | | |
| I4 | Idle Pattern 4 | | |
| | 355 | | |
| Im | Idle Pattern m | | |
| H1 | Line number [11:4] 350 | Packet Headers | 320 |
| H2 | Line number [3:0], Video Format [11:8] 360 | | |
| H3 | Video Format [7:0] 360 | 380 | |
| H4 | Audio Format 370 Number of Audio Words | | |
| H5 | Audio Clock Divider [15:8] | 397 | |
| H6 | Audio Clock Divider [7:0] | | |
| H7 | Control Word #1 | 390 | |
| H8 | Control Word #2 | | |
| H9 | Control Word #3 | | |
| H10 | Control Word #4 | | |
| V1 | Video Word 1 | Video Words | 330 |
| V2 | Video Word 2 | | |
| V3 | Video Word 3 | | |
| | 392 | | |
| Vn-1 | Video Word n-1 | | |
| Vn | Video Word n | | |
| A1 | Audio Word 1 | Audio Words | 340 |
| A2 | Audio Word 2 | | |
| | 394 | | |
| Am | Audio Word m | | |

SCHEME FOR TRANSMITTING VIDEO AND AUDIO DATA OF VARIABLE FORMATS OVER A SERIAL LINK OF A FIXED DATA RATE

BACKGROUND

1. Field of the Invention

This invention pertains in general to transmission of uncompressed video and audio data over a serial link, and in particular to transmission of uncompressed video and audio data over a single serial communication channel at a fixed data rate.

2. Background of the Invention

It is well-known in the art to represent uncompressed video data by pixels, lines, and frames. Each video format is characterized by a number of pixels per line, number of lines per video frame, and number of frames per second. These characteristics determine the pixel clock rate at which pixels are generated, the line rate at which a line of pixels is generated per second, and the frame rate at which video frames are generated.

For example, 720×480 p @60 HZ video format has the following characteristics:

Pixels per line=720
Lines per frame=480
PIXEL_CLK rate=27.027 Mhz
Line rate=31.5 KHz
Frame Rate=60 Hz XGA 1024×768@60 Hz video format has the following characteristics:

Pixels per line=1024
Lines per frame=768
PIXEL_CLK rate=65.0M Mhz
Line Rate=48.36 KHz
Frame Rate=60 Hz When the data selected from a group of various video formats is transmitted from a video source, such as a DVD, to a video monitor over a serial link in real time, the receiving side should be able to recover the original data for all video formats. In order to properly reconstruct original data at the destination side, the data needs to be carried over the communication channel along with video synchronization signals HSYNC and VSYNC and the timing signal PIXEL_CLK.

The newly adopted DVI (Digital Visual Interface) and HDMI (High Definition Multi-Media Interface) standards use four pairs of links to transmit video and audio data such that three pairs of links are used for transmission of video data and one pair is used for transmission of the timing signal. Both DVI and HDMI, as well as other newly proposed schemes, are capable of supporting various video formats. However, by requiring an extra communication channel to transmit the timing signal these standards significantly increase the cost of data transmission.

Many applications currently require that uncompressed audio and video signals be transmitted over a serial link having a single communication channel. To this end, all video and audio data as well as a timing signal have to be transmitted over the single channel. Existing single-channel communication systems that do not have a separate channel for the timing signal transmit data at a fixed data rate of the communication channel. Because pixel clock rate varies for each video format, existing single-channel communication systems do not support transmission of video data selected from a group of various video formats over the single communication channel of the fixed data rate.

Moreover, transmitting video data over a single communication channel requires a great bandwidth so that a large amount of information can be sent at a given amount of time. Video data has an active period and blanking period. The blank period constitutes about 20% of the total communication bandwidth and does not carry useful display information. Accordingly, blanking period required by certain display devices makes a part of the available bandwidth not usable. Many existing schemes utilize the blanking period to carry control information or audio data. However, the bandwidth requirement of control information and audio data is very minimal. Accordingly, the current solutions still do not address the bandwidth problem in communication systems that transmit video data.

It is therefore desirable to provide a framing format that has the flexibility of supporting transmission of data selected from a group of various video formats and pixel clock rates over a single communication channel. In addition, it is desirable to provide a mechanism that saves communication bandwidth by transmitting only the active video data selected from a group of various video formats over a single communication channel.

SUMMARY OF THE INVENTION

A framing format for transmitting uncompressed video data selected from a group of various formats, audio data and control data over a single communication channel at a fixed data rate is described. The framing format and transmission scheme does not require a dedicated clock channel for transferring a timing signal. The timing signal and synchronization signals are embedded into the single data stream and recreated at the destination side. The high efficiency of the framing format is achieved by completely suppressing blank pixels and transferring only active pixels over the link.

A preferred embodiment of the present invention comprises a transmitter unit and a receiver unit coupled by a single-channel serial communication link. The transmitter unit preferably receives a plurality of data streams, such as video data, audio data and control data, builds a data packet that includes a subset of video data, a subset of audio data and a subset of control data, and transmits the data packet over the single communication channel at a fixed data rate. In one implementation, the transmitter unit inserts IDLE characters sufficient to transmit video data selected from a group of various video formats over a single communication channel.

The receiver unit preferably receives the data packet over the link, identifies video data, audio data and control data from the packet, and regenerates the original timing signal for the video and audio data. The receiver unit then regenerates the video data by inserting blank data and outputs the video data at the pixel clock rate specified by the format of that video data. The receiver unit regenerates the audio data and transmits the audio data at the audio data rate specified by the format of that audio data.

The transmitter unit preferably comprises an automatic video detector block adapted to receive video data, detect format of the video data based on synchronization signals HSYNC and VSYNC, and output the video data along with the video format code to a video formatting block. The video data formatter block is adapted to receive the video data and video format code and detect active pixels and blank pixels in the video data. The video data formatter block further determines the beginning and end of each line of the video data and suppresses blank pixels for a line of video data while transmitting active pixels only. The video data formatter block also has a line number counter that keeps track of position (line number) of the current line of video. The transmitter unit further comprises a memory buffer adapted to store active pixels for one line of the video data. The transmitter unit further comprises an audio data formatter block that receives the audio data and performs serial-to-parallel conversion of the audio data.

The transmitter unit further comprises a framing/audio/video/control data multiplexor adapted to receive one line of video data, a subset of audio data and a subset of control data and build a data packet that preferably includes one line of video data, audio data received during the time period over which one line of video data was received, and four bytes of control data. In one embodiment, the multiplexor inserts IDLE characters into the packet sufficient to transmit the video data selected from a group of various video formats over the single communication channel at a fixed data rate. A parallel-to-serial converter is adapted to receive the data packet, convert parallel video data in the data packet to serial data and transmit the packet over link.

The receiver unit comprises a serial-to-parallel converter adapted to receive the data packet over the communication link, convert video data and audio data in the packet into the parallel format and output the data packet to a demultiplexor. The demultiplexor receives the data packet, identifies video and audio data, and writes the audio data into an audio buffer and video data into a video buffer. The receiver unit further comprises a video frame controller block adapted to receive one line of video data at a time, regenerate synchronization signals HSYNC and VSYNC and a timing signal, and regenerate a video frame from active pixels. The video frame controller block is further adapted to transmit the regenerated video data at a pixel clock rate specified by the applicable video format.

The receiver unit further comprises an audio data formatter block for receiving audio data from the demultiplexor, converting the received audio data to the original format, and outputting the audio data at an audio data rate specified by the applicable audio format.

The present invention also includes a method for transmitting video data selected from a group of various video formats, audio data, and control data over a single communication channel at a fixed data rate. The present invention also includes a data structure for transmitting video data selected from a group of various video formats, audio data, and control data over a single communication channel.

BRIEF DESCRIPTION OF THE DRAWINGS

FIG. 3 is a block diagram of a format of a data packet for transmitting video data selected from a group of various formats, audio data, and control data over a single serial communication link

DETAILED DESCRIPTION OF THE PREFERRED EMBODIMENTS

Figure 1:
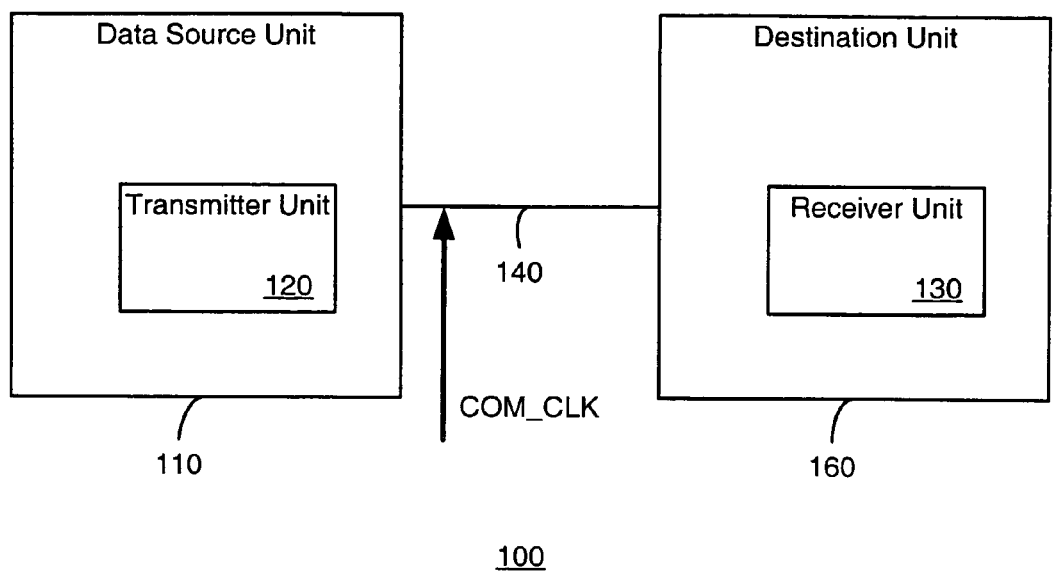
FIG. 1 is a block diagram of a communication system for transmitting video data selected from a group of various formats, audio data, and control data over a single serial communication link.

FIG. 1 is a block diagram of a communication system 100 of the present invention for transmitting video and audio data over a single communication channel. Communication system 100 is adapted to receive video data selected from a group of various video formats, audio data and control data and transmit the received data over a single communication channel 140 at a fixed data rate without transmitting a timing signal. As used herein, "fixed data rate" refers to a number of bits of data transmitted per second.

System 100 includes a data source unit 110 and a destination unit 160 connected over a serial link 140. Data source unit 110 is, for example, a DVD player, a set-top box, or any other device capable of generating video data of various video formats and audio data. Destination unit 160 is, for example, a video monitor, computer display, or any other device capable of displaying video data of various video formats. Serial link 140 is, for example, a wired, wireless, or optical fiber link adapted to transmit video of various formats, audio and control data. Link 140 includes a single communication channel for transmitting video and audio data at a fixed data rate. The term "channel" as used herein refers to that portion of the serial link 140 that is used to transmit data.

Data source unit 110 further comprises a transmitter unit 120. Unit 120 receives video/audio/control data from data source unit 110, builds a data packet having a flexible framing format, and transmits the data packet over serial link 140. Transmitter unit 120 optionally performs other functions such as encrypting the data to be transmitted and other operations relating to transmission and encoding of the data. Data source unit 110 is connected to transmitter unit 120 via a video bus, such as a 24-bit bus (not shown in FIG. 1). When transmitter unit 120 is a stand-alone device, the connection between units 110 and 120 is preferably maintained over a standard DVI (Digital Visual Interface) or HDMI (High Definition Multi-Media Interface) cable (not shown in FIG. 1).

Destination unit 160 further comprises a receiver unit 130. Units 160 and 130 are connected via a video bus, such as a 24-bit bus (not shown in FIG. 1). Receiver unit 130 receives the video, audio, control data from the serial link 140 and reconstructs the data according to the applicable video and audio format. Receiver unit 130 fully reconstructs PIXEL_CLK signal for the video data. "Receiver unit" as used herein denotes any device adapted to receive encoded data, decode the data and optionally other functions related to reception, decoding and decryption of the data transmitted over the serial link 140. When unit 130 is a stand-alone device, the connection between units 130 and 160 is preferably maintained over a standard DVI or HDMI cable (not shown in FIG. 1).

System Architecture

1. Transmitter Unit

Figure 2:
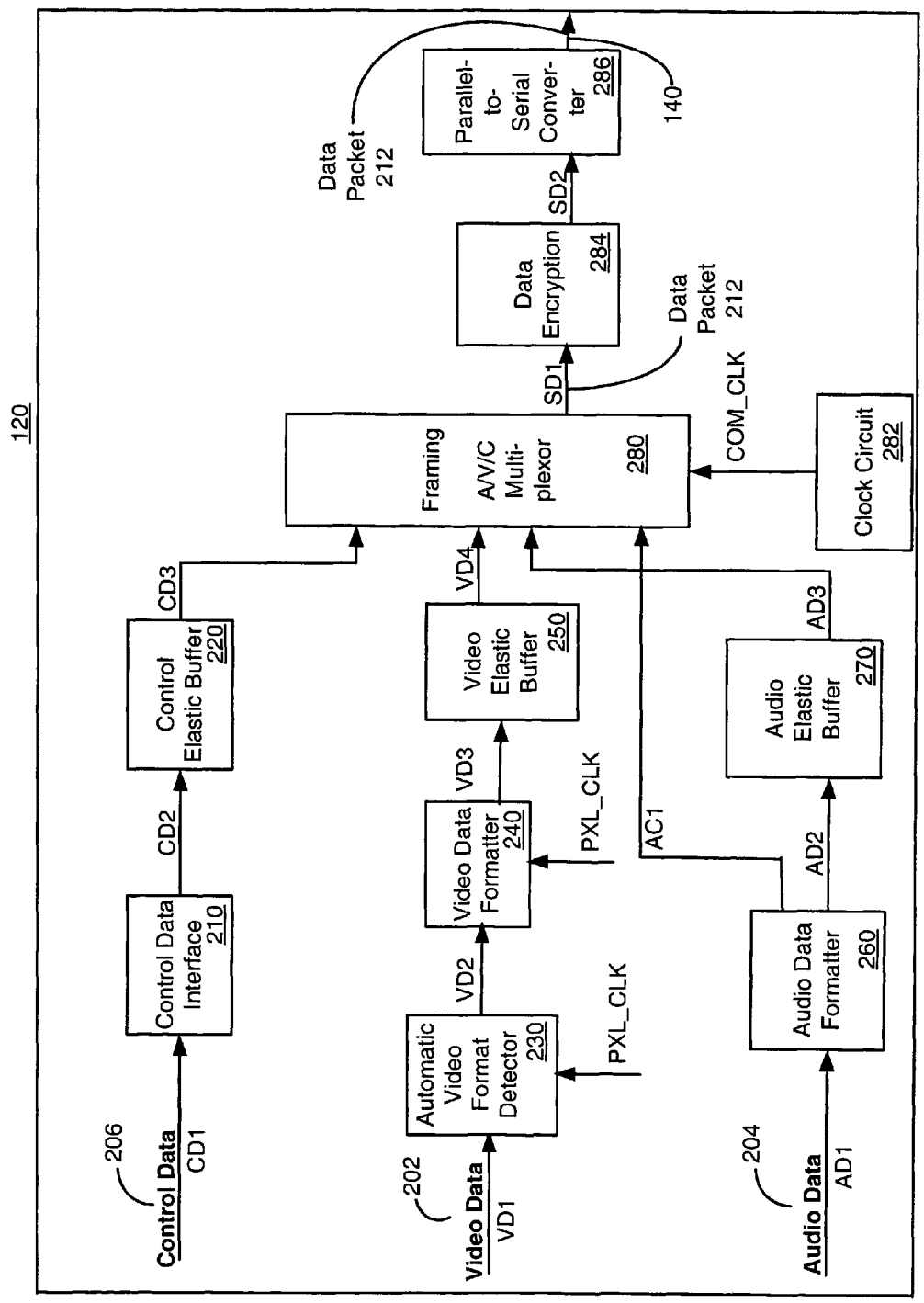
FIG. 2 is a block diagram of a transmitter unit adapted to transmit video data selected from a group of various formats, audio data, and control data over a single serial communication link at a fixed rate.

FIG. 2 is a block diagram of transmitter unit 120 for transmitting video data selected from a group of various formats, audio data and control data over serial link 140. Transmitter unit 120 is adapted to receive video data 202, audio data 204, and control data 206 from the data source unit 110 shown in FIG. 1, to build a data packet 212, and to transmit the data packet 212 over channel 140. In a preferred embodiment, unit 120 comprises an Automatic Video Detector 230, Video Data Formatter 240, Video Elastic Buffer 250, Control Data Interface 210, Control Elastic Buffer 220, Audio Data Formatter 260, Audio Elastic Buffer 270, Framing A/V/C Multiplexor 280, Data Encrypter 284, and Parallel-to-Serial Converter 286.

A. Video Data Transmission

In a preferred embodiment, video data 202 is a 28-bit parallel digital signal such that 8 bits are used for a red channel, 8 bits are used for a green channel, 8 bits are used for a blue channel, one bit for HSYNC signal (not shown), one bit for VSYNC signal (not shown), one bit of DE signal (not shown), and one bit of PIXEL_CLK signal (not shown). It should be understood that although video bus VD1 is shown as one signal line on FIG. 2, in a preferred embodiment, video data 202 is inputted into Automatic Video Format Detector 230 using, for example, 28 signal lines.

One skilled in the art would understand that synchronization signal HSYNC is used to indicate the start of a new video line and VSYNC is used to indicate the start of a new frame. One skilled in the art would also understand that video data 202 for a new pixel is generated at the data source 110 shown in FIG. 1 on every rising edge of PIXEL_CLK signal. HSYNC and VSYNC change their value from low to high on the rising edge of PIXEL_CLK signal as is known in the art.

Automatic Video Format Detector 230 receives video data 202 via 28-bit VD1 bus, detects format of the video data 202 based on synchronization signals HSYNC and VSYNC, and outputs the video data 202 along with the video format code.

Block 230 preferably keeps three running counters to identify the number of pixels in each line of video data 202, the number of lines in each frame for the incoming video data 202, and the number of VSYNC signals per second. The first counter is used to determine the number of pixels per line. This counter is reset to zero at the starting edge of HSYNC and incremented by one for every rising edge of the PIXEL_ CLK signal until the next starting edge of the HSYNC signal which indicates the last pixel in the line. The counter is reset to zero again at the next starting edge of HSYNC once the end of the line is reached.

A second counter is used to count the number of lines per frame. To this end, the second counter is reset to zero at the starting edge of VSYNC and incremented by one for every starting edge of HSYNC until the next starting edge of VSYNC (the last line in the frame). The counter is reset to zero again at the next starting edge of VSYNC once the end of the video frame is reached.

A third counter is used to count the number of VSYNC signals per second.

Block 230 maintains characteristics for all video formats supported by communication system 100. Table 1 below lists a preferred embodiment of formats supported by system 100. One skilled in the art would understand that the list of formats shown in Table 1 is not exhaustive and other formats can be supported by system 100.

TABLE 1

Most Frequently Supported Video Formats

| Video Format Code (Hex-decimal) | Video Format |
|---|---|
| EIA/CEA Video Format | |
| 1 | 413 | 640 × 480 p @ 59.94 Hz/60 Hz |
| 2 | 423 | 720 × 480 p @ 59.94 Hz/60 Hz |
| 3 | 325 | 720 × 576 p @ 50 Hz |
| 4 | 336 | 1280 × 720 p @ 50 Hz |
| 5 | 436 | 1280 × 720 p @ 59.94 Hz/60 Hz |

TABLE 1-continued

Most Frequently Supported Video Formats

| Video Format Code (Hex-decimal) | Video Format |
|---|---|
| 6 | 440 | 720(1440) × 240 p @ 59.94 Hz/60 Hz |
| 7 | 442 | 720(1440) × 480 i @ 59.94 Hz/60 Hz |
| 8 | 341 | 720(1440) × 288 p @ 50 Hz |
| 9 | 344 | 720(1440) × 576 i @ 50 Hz |
| 10 | 343 | 1440 × 480 p @ 50 Hz |
| 11 | 345 | 1440 × 576 p @ 50 Hz |
| 12 | 457 | 1920 × 1080 i @ 59.94 Hz/60 Hz |
| 13 | 357 | 1920 × 1080 i @ 50 Hz |
| 14 | 058 | 1920 × 1080 p @ 23.97 Hz/24 Hz |
| 15 | 158 | 1920 × 1080 p @ 25 Hz |
| 16 | 258 | 1920 × 1080 p @ 29.97 Hz/30 Hz |
| 17 | 358 | 1920 × 1080 p @ 50 Hz |
| 18 | 458 | 1920 × 1080 p @ 59.94 Hz/60 Hz |
| 19 | 460 | 2880 × 240 p @ 59.94 Hz/60 Hz |
| 20 | 361 | 2880 × 288 p @ 50 Hz |
| 21 | 364 | 2880 × 576 i @ 50 Hz |
| VESA Video Format | | |
| 30 | 489 | 800 × 600 @ 60 Hz |
| 31 | 589 | 800 × 600 @ 75 Hz |
| 32 | 689 | 800 × 600 @ 85 Hz |
| 33 | 49A | 1024 × 768 @ 60 Hz |
| 34 | 59A | 1024 × 768 @ 75 Hz |
| 35 | 69A | 1024 × 768 @ 85 Hz |
| 36 | 5AB | 1152 × 864 @ 75 Hz |
| 37 | 4BA | 1280 × 768 @ 60 Hz |
| 38 | 5BA | 1280 × 768 @ 75 Hz |
| 39 | 6BA | 1280 × 768 @ 85 Hz |
| 40 | 4BC | 1280 × 960 @ 60 Hz |
| 41 | 6BC | 1280 × 960 @ 85 Hz |
| 42 | 4BD | 1280 × 1024 @ 60 Hz |
| 43 | 5BD | 1280 × 1024 @ 75 Hz |
| 44 | 6BD | 1280 × 1024 @ 85 Hz |
| 45 | 4CA | 1360 × 768 @ 60 Hz |

Block 230 uses the number of pixels in the first counter, the number of lines in the second counter and the number of VSYNC per second in the third counter to identify the format of the video data 202. For example, if the first counter indicates that the number of pixels per line is 858, the number of lines per frame is 525, and the number of frames per second is 60, block 230 determines that the video data 202 is formatted using 480 P video format. If, for example, the number of pixels per line is 1344 and the number of lines per frame is 806, block 230 determines that the video data 202 is formatted using XGA Mode.

Block 230 outputs on bus VD2 the original video data 202 and a 12-bit video format code. Video format code is a 12-bit word that is used by receiver unit 130 to detect the video format and pixel clock rate. In one implementation, the 12-bit word is separated into three fields of four bits each as shown below:

Bits 0-3: code for number of lines per frame (for example, 806);

Bits 4-7: code for number of pixels per line (for example, 1344); and

Bits 8-11: code for number of frames per second (for example, 50 HZ).

Video Data Formatter Block 240 is adapted to receive the video data 202 and video format code from Block 230 via bus VD2. Block 240 is further adapted to detect active pixels and blank pixels in the video data 202, determine the beginning and end of each line of the video data 202, and to suppress blank pixels while transmitting only active pixels.

To detect the beginning and end of each line of pixels, block 240 uses the video format code received from block 230 and specification known for each video format. See, for example, *EIA Standard: A DTV Profile For Uncompressed High Speed Digital Interface, EIA/CEA-861-B*", May 2002 and *VESA and Industry Standards and Guidelines For Computer Display Monitor Timing*, version 1.0, Revision 0.9, Aug. 21, 2003. Each video format specifies a number of pixels from the starting edge of HSYNC to the beginning and end of active pixels for each video line. For example, the specification for a particular format indicates that active pixels start at position X and end at position Y. Block 240 maintains a running counter that is set to 0 at the starting edge of HSYNC signal and incremented by one at the rising edge of PIXEL_CLK signal. When the counter value is X, block 240 detects where active pixels start. Similarly, when the counter value is Y, it indicates where active pixels end.

In a preferred embodiment, once active pixels have been identified, block 240 suppresses blank pixels and outputs on bus VD3 one line of video data 202 for active pixels only. In addition, block 240 keeps a running counter to indicate the current line number. The value of this counter is set to 0 at the starting edge of VSYNC and incremented by one at the next starting edge of HSYNC. The current value of the counter along with the current video line for active pixels are transmitted to Video Elastic Buffer 250 via bus VD3. Because blank pixels typically constitute about 20% of the total communication bandwidth and do not carry useful information for displaying video data, the present invention advantageously increases the communication bandwidth by suppressing the blank pixels and transmitting active pixels only over the communication channel 140.

It should be understood that video data 202 is transmitted from block 230 to block 240 and from block 240 and to block 250 at the pixel clock rate specified by the video format for the video data 202.

Video Elastic Buffer 250 is, for example, a FIFO memory buffer adapted to receive one line of active pixels of video data 202 via bus VD3 and temporarily store the video data 202 before the data is transmitted over communication channel 140. In a preferred implementation, buffer 250 stores one line of video data 202 so that the buffer 250 will not overflow or underflow during the transmission of one line of video data 202.

B. Audio Data Transmission

In a preferred embodiment, audio data 204 represents serial digital audio signals and audio clock signal (AUDIO_CLK). The audio data 204 arrives on audio bus AD1 as a continuous data stream with the data rate specified by the audio clock signal. Audio clock signal is asynchronous and independent of the fixed rate clock of channel 140.

Audio Data Formatter Block 260 receives audio data 204 and converts the serial audio data 204 into the parallel format as is known in the art. The present invention provides a new method for audio clock recovery by receiver unit 130. In one implementation, Audio Data Formatter Block 260 maintains a running counter that counts the number of audio clock cycles during the time one line of video data 202 is received. This number is referred to as "an audio clock divider." The counter is reset to zero at the starting edge of HSYNC and incremented for every rising edge of the AUDIO_CLK signal until the next starting edge of HSYNC. The counter is reset to zero again at the next starting edge of HSYNC once the end of the video line is reached. Block 260 sends the audio clock divider to Framing A/V/C Multiplexor 280 via AC1 bus.

Audio Elastic Buffer 270 is a memory buffer adapted to receive converted audio data 204 on bus AD2 and store the converted audio data 204 before transmitting the audio data 204 to Framing A/V/C Multiplexing Block 280. Buffer 270 maintains a running counter that is incremented as a new audio word is written into buffer 270 and decremented as an audio word is read from the buffer 270. This number in the counter is used to determine the number of audio words to be transmitted over communication channel 140.

C. Control Data Transmission

Control data 206 is general-purpose data, such as remote control information, channel selection, serial link control, or HDCP (High-Bandwidth Digital Content Protection System) key exchange information. Control data 206 is inputted into Control Data Interface Block 210 via a general-purpose processor bus CD1 adapted to transfer data from any external device, such as device 110.

Block 210 receives control data 206 and outputs the control data 206 to Control Elastic Buffer 220. Control Elastic Buffer 220 is a memory buffer adapted to receive control data 206 via data bus CD2 and store the control data 206 before transmitting the data 206 to Framing A/V/C Multiplexing Block 280.

D. Framing A/V/C Data into Data Packets

Framing A/V/C Multiplexor Block 280 receives a subset of video data 202 for active pixels via VD4, a subset of audio data 204 via AD3, and a subset of control data 206 via CD3. Block 280 receives the current video line number from block 240, the video format code from block 230, and a number of audio words from block 270. Block 280 builds a data packet 212 that includes the subset of video data 202, subset of audio data 204, and subset of control data 206. Block 280 also adds IDLE characters to the data packet 212 as necessary to transmit the packet 212 at the fixed data rate. Block 280 also transmits the data packet 212 over single communication link 140 at a fixed data rate. In one embodiment the subset of video data 202 is one line of video data 202; a subset of audio data 204 is the number of audio words received during the period of time one line of video data 202 is received. A subset of control data 206 is four bytes of control data 206.

One skilled in the art would understand that although in the preferred embodiment the data packet 202 carries one line of the video data 202, data packet 212 is adapted to carry any subset of the video data 202 for transmission over channel 140.

Clock circuit 282 is adapted to generate a COM_CLK signal, which controls transmission of data packets 212 over communication channel 140 at a fixed data rate. Circuit 282 is, for example, a crystal oscillator or any other type of clocking circuit adapted to generate a timing signal.

FIG. 3 shows format 300 of the data packet 212 assembled by block 280. As shown in FIG. 3, the format 300 includes the following fields: idle patterns field 310, packet headers 320, video words 330, and audio words 340.

Idle Pattern Field 310

As previously described, transmitter unit 120 receives video data 202 selected from a group of video formats, such as the ones listed in Table 1. System 100 advantageously transmits the video data 202, audio data 204, and control data 206 over channel 140 at a fixed data rate without transmitting a PIXEL_CLK signal.

As previously described, each video format is characterized by a pixel clock rate at which pixels are generated, line rate at which a line of pixels is generated per second, and frame rate at which video frames are generated per second. For example, video format 720×480 @ 60 Hz (typically referred to as 480 p video format) has a slower pixel clock rate than 1280×720 @ 60 Hz (typically referred to as 720 p video format). 720 p video format, in turn, has a slower pixel clock rate than SXGA format. To transmit video data 202 selected from a group of different video formats over a single communication channel at a fixed data rate, which could be equal to the pixel clock rate of, for example, SXGA format, unit 120 inserts IDLE characters to data packet 212 sufficient to transmit video data 202 at the fixed data rate of channel 140.

The length of the idle pattern field 310 is variable and depends on the pixel clock rate of video data 202. For example, if the video data 202 is of 480 p video format, a greater number of idle characters will be inserted than for the video data 202 of 720 p video format. Thus, idle patterns 355 allow system 100 to transmit video data selected from a group of various video formats and various pixel clock rates over a single communication channel at a fixed data rate. Idle patterns 355 are transmitted continuously until a line of video data is ready in the video elastic buffer 250, as described below by the following pseudo-code:

IF (Video Data Ready)
Transmit Header
Transmit Control Words
Transmit Video Words
Transmit Audio Words
ELSE
Transmit idle characters (K28.5 characters).

Packet Headers 320

Packet headers preferably include the following data: line number 350, video format 360, audio format 370, number of audio words 380, control words 390, and audio clock divider 397. In a preferred embodiment, the length of the packet headers field 320 is 10 bytes.

Line number 350 is the current line number that has been determined by block 240.

Video format 360 is a video format code that has been generated by block 230. As previously described, video format 360 is a 12-bit word separated into three fields of four bits each as shown below:

Bits 0-3: code for number of lines per frame (for example, 806);
Bits 4-7: code for number of pixels per line (for example, 1344); and
Bits 8-11: code for number of frames per second (for example, 50 HZ).

Number of audio words 380 represents the number of audio words determined by block 270.

Control words 390 are four words 390 of control data 206.

Audio Clock Divider 397 includes the number of audio clock cycles over the period of time one line of video data 202 is received. Audio clock divider 397 is used by receiver unit 130 to recover the original AUDIO_CLK signal as will be discussed in more detail below.

Video Words 330

Video words field 330 includes video words 392 for one line of video data 202 for active pixels. The length (N) of field 330 is variable because it depends on a particular video format since each video format has a different number of active pixels per line. For example, XGA video format is characterized by 1344 pixels per line, of which 1024 are active pixels. For 24 bit video data:

Number(N) of video words=number of active pixels per line*3 (Each pixel has 3 bytes of video data)

For XGA Video Format:
N=1024*3=3072 video words.

Audio Words 340

Audio words field 340 preferably includes audio words 394 received over the period of time during which one line of video data 202 is received. The length of this field is variable because it depends on the audio clock rate and the time period over which the current line of video data 202 is received. One audio word equals eight bits of audio data 204.

It should be noted that because system 100 advantageously supports transmission of video data selected from a group of various video formats, the size of the data packet 212 is variable and depends on the format of video and audio data currently transmitted.

One skilled in the art would appreciate that the format 300 of the data packet 212 is not limited to the aforementioned fields and that some of the fields may not be required. Similarly, other fields may be included in the data packet 212 as necessary.

The output of block 280 is data packet 212 having the format described above in reference to FIG. 3.

Data Encrypter Block 284 optionally receives data packet 212 at a fixed data rate on data bus SD1. Block 284 is adapted to encrypt the video data 202 and audio data 204 in the packet 212 using, for example, High-Bandwidth Digital Content Protection System (HDCP) or other encryption schemes used for data encryption. As previously described, control words 290 can be used to carry key exchange or other information used for data encryption. The output of block 284 is encrypted audio and video data.

Parallel-to-Serial converter 286 is adapted to receive data packet 212 with encrypted audio and video data via bus SD2, convert parallel video data in the data packet 212 to serial data, and transmit the packet 212 over link 140 to receiver unit 130. In a preferred embodiment, parallel-to-serial converter 286 is a commercially available SERDES chip with 8 B/10 B encoding such that it converts each video word 392 from 8 bits to 10 bits. One skilled in the art would understand that Converter 286 multiplies COM_CLK rate by 10 and then serializes the 10 bits of video data 202 out to communication channel 140 using one COM_CLK period.

2. Receiver Unit

Figure 4:
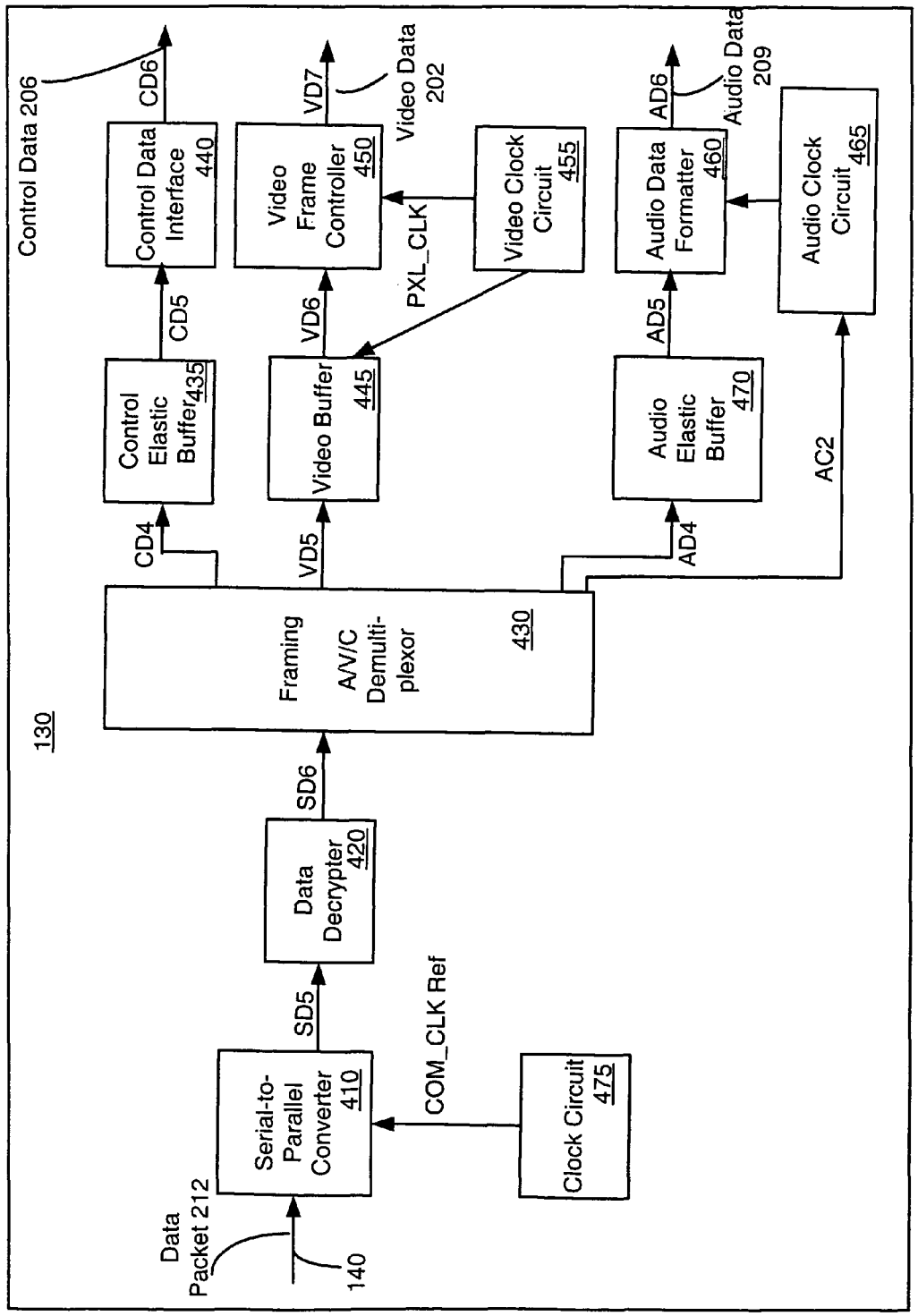
FIG. 4 is a block diagram of a receiver unit adapted to receive video data selected from a group of various formats, audio data, and control data over a single serial communication link and reconstruct the data.

FIG. 4 is a block diagram of a receiver unit 130 adapted to receive, over single communication link 140, the data packet 212 that preferably includes a subset of video data 202 selected from a group of various video formats, a subset of audio data, and a subset of control data. Receiver unit 130 further comprises: Serial-to-Parallel Converter 410, Data Decrypter 420, Framing A/V/C Demultiplexor 430, Control Elastic Buffer 435, Video Buffer 445, Audio Elastic Buffer 470, Control Data Interface 440, Video Frame Controller 450, Video Clock Circuit 455, Audio Data Formatter 460, and Audio Clock Circuit 465.

Serial-to-parallel converter 410 receives the data packet 212 over the serial link 140 and converts the subset of video data 202 and subset of audio data 204 in the data packet 212 to parallel format as is well-known in the art. Converter 410 also recovers the original COM_CLK signal used by transmitter unit 120 to transfer the data packet 212 over channel 140. In a preferred embodiment, Clock Circuit 475 generates a COM_CLK REF signal that is used by the serial-to-parallel converter 410 as a reference clock. Those skilled the art would understand that the serial-to-parallel converter 410 uses COM_CLK REF signal and incoming video and audio data to recover COM_CLK used by the transmitter unit 120. In addition, serial-to-parallel converter 410 detects IDLE characters. Converter 410 transmits the data packet 212 to Data Decrypter 420.

Data decrypter 420 receives the data packet 212 and decrypts video words 392 and audio words 394 using well-known decryption techniques. Block 420 outputs data packet 212 with decrypted video 392 and audio 394 words to Framing A/V/C Demultiplexor 430 on bus SD6.

Framing A/V/C Demultiplexor 430 receives the data packet 212 and identifies video data 202, audio data 204, and control data 206. To this end, Demultiplexor 430 maintains a counter that is set to zero when IDLE characters are detected. As each word in the data packet 212 is received, demultiplexor 430 increments the counter at the rising edge of each COM_CLK signal. For example, as shown in FIG. 3, the first and the second word in the data packet 212 following IDLE characters 355 are line number 350. When the counter value is 1 and 2, the line number 355 is received. When the counter value is 2 and 3 video format code 360 is received. Similarly, when the counter value is 5 and 6 audio clock divider 397 is received.

Based on the value in the counter, demultiplexor 430 identifies current video line number, the video format, and number of audio words from the packet headers 320. In a preferred embodiment, demultiplexor 430 identifies four bytes of control words 390 in the packet 212 and writes the identified control words 390 to Control Elastic Buffer 435 using a general-purpose microprocessor. Demultiplexor 430 also identifies the audio clock divider 397.

Once the video format has been identified, demultiplexor 430 identifies video words 392 for the current video line and writes the identified video words 392 and the current line number to Video Buffer 445 via bus VD5 at a fixed data rate. It should be noted that IDLE characters are not transmitted to video buffer 445.

Similarly, using the counter, Demultiplexor 430 identifies audio words 394 transmitted at the end of the data packet 212. The identified audio words 394 are written into Audio Elastic Buffer 470 at a fixed data rate.

Demultiplexor 430 identifies an audio clock divider 397 and transmits the audio clock divider 397 to audio clock circuit 465 via bus AC2. Audio clock circuit 465 uses audio clock divider 397 to regenerate original audio clock signal.

Video Clock Circuit 455 generates PIXEL_CLK signal that controls Video Elastic Buffer 445 and Video Frame Controller Block 450. The PIXEL_CLK signal is generated, for example, using a phase-lock-loop (PLL) as is well-known in the art Briefly, Circuit 455 regenerates PIXEL_CLK at the following rate:

Pixel_CLK Rate=Packet Rate of Serial Link*Total number of pixels per line

Where

Packet rate is the rate in packets per second at which packets arrive at the serial link 140.

Total number of pixels per line includes both active and blank pixels. The total number of pixels is determined from the video format code of the video data 202.

In an alternative embodiment, a free running clock method is used to regenerate the PIXEL_CLK signal based on the applicable video format. For example, XGA: 1024×768 @ 60 Hz: Pixel Clock=65 MHz
480 P: 720*480 @ 60 Hz: Pixel Clock=27.027 Mhz
720 P: 1280*720 @ 60 Hz: Pixel Clock=74.25 Mhz
1080i: 1920*1080i@ 60 Hz: Pixel Clock=74.25 Mhz To implement this embodiment, a programmable oscillator or a programmable clock multiplier/divider is used to dynamically generate PIXEL_CLK signal for video data 202 selected from a group of various video formats.

In a preferred embodiment, video buffer 445 receives one line of video data 202 via bus VD5. Video Buffer 445 is, for example, a memory buffer adapted to store video data 202. The size of the Video Buffer 445 is selected based on the pixel clock generation method. For example, when the PLL technique is used to regenerate PIXEL_CLK signal, Video Buffer 445 preferably holds one line of video data 202. In the alternative, when a free running clock embodiment is used, Video Buffer 445 preferably holds one frame of video data 202.

Video Frame Controller Block 450 is adapted to receive one line of video data 202 via bus VD6 and regenerate synchronization signals HSYNC and VSYNC. Block 450 is further adapted to regenerate a line of video data from active pixels using the video format code, active pixels, and current line number. The following references disclose how one line of video data is regenerated from active pixels: *EIA Standard: A DTV Profile For Uncompressed High Speed Digital Interface, EIA/CEA-861-B"*, May 2002 and *VESA and Industry Standards and Guidelines For Computer Display Monitor Timing*, version 1.0, Revision 0.9, Aug. 21, 2003. The following example will illustrate how a line of video data 202 is generated from active pixels for 720 p video format, which has the following characteristics:

Total number of pixels: 1650
Active pixels: 1280
Blank pixels: 370

HSYNC starts 110 pixel clock cycles after the last active pixel and lasts 40 pixel clock cycles.

VSYNC is asserted when the line number is between 1 and 6 inclusively.

Using the above information, block 450 maintains a counter that counts from 0 to 1649 in a continuous and cyclic fashion. Block 450 increments the counter by one for every rising edge of the PIXEL_CLK signal. Block 450 outputs one pixel for every rising edge of PIXEL_CLK signal for the counter value between zero and 1279. Thus, block 450 outputs 1280 active pixels on bus VD7 at a PIXEL_CLK rate.

Block 450 continues incrementing the counter for every rising edge of PIXEL_CLK signal. When the counter has a value between 1279 and 1649, block 450 outputs zeros (370 blank pixels) on video bus VD7 at a PIXEL_CLK rate.

When the counter is between 1390 and 1429, HSYNC is asserted.

To regenerate the VSYNC signal, block 450 reads the current line number from the video buffer 445 for each line of video data 202. When the line number value is between 1 and 6 (inclusively), VSYNC is asserted, otherwise, VSYNC is de-asserted.

The Audio Elastic Buffer 470 receives audio words 394 and stores audio words 394 before transmitting to Audio Data Formatter Block 460. Buffer 470 is a memory buffer for storing audio data.

Block 460 receives audio words 394 from buffer 470 via bus AD5, converts the received audio words 394 to the original audio format as is known in the art, and outputs audio words 394 on bus AD6. Audio Clock Circuit 465 is preferably a PLL circuit adapted to regenerate the original audio clock signal with which audio data 204 was received by transmitter unit 120. Circuit 465 regenerates the audio clock signal as follows:

Audio Clock Rate=Packet Rate of Serial Link*Audio clock divider

Where:

Packet rate of the serial link is the rate at which packets arrive at the serial link in packets per second.

Audio clock divider is generated by the transmitter unit 120 and passed to the receiver unit 130 in the packet header 320 of data packet 212.

Audio data formatter 460 transmits regenerated audio data 204 to destination unit 160 at the rate of the recovered audio clock signal.

Control Elastic Buffer 435 receives control words 390 from Block 430 and temporarily stores control words 390. Control Data Interface Block 440 reads control words 390 out of Buffer 435 via CD5 and outputs control words 390 to destination device 160 via control data bus CD6.

Methods of Operation

Figure 5:
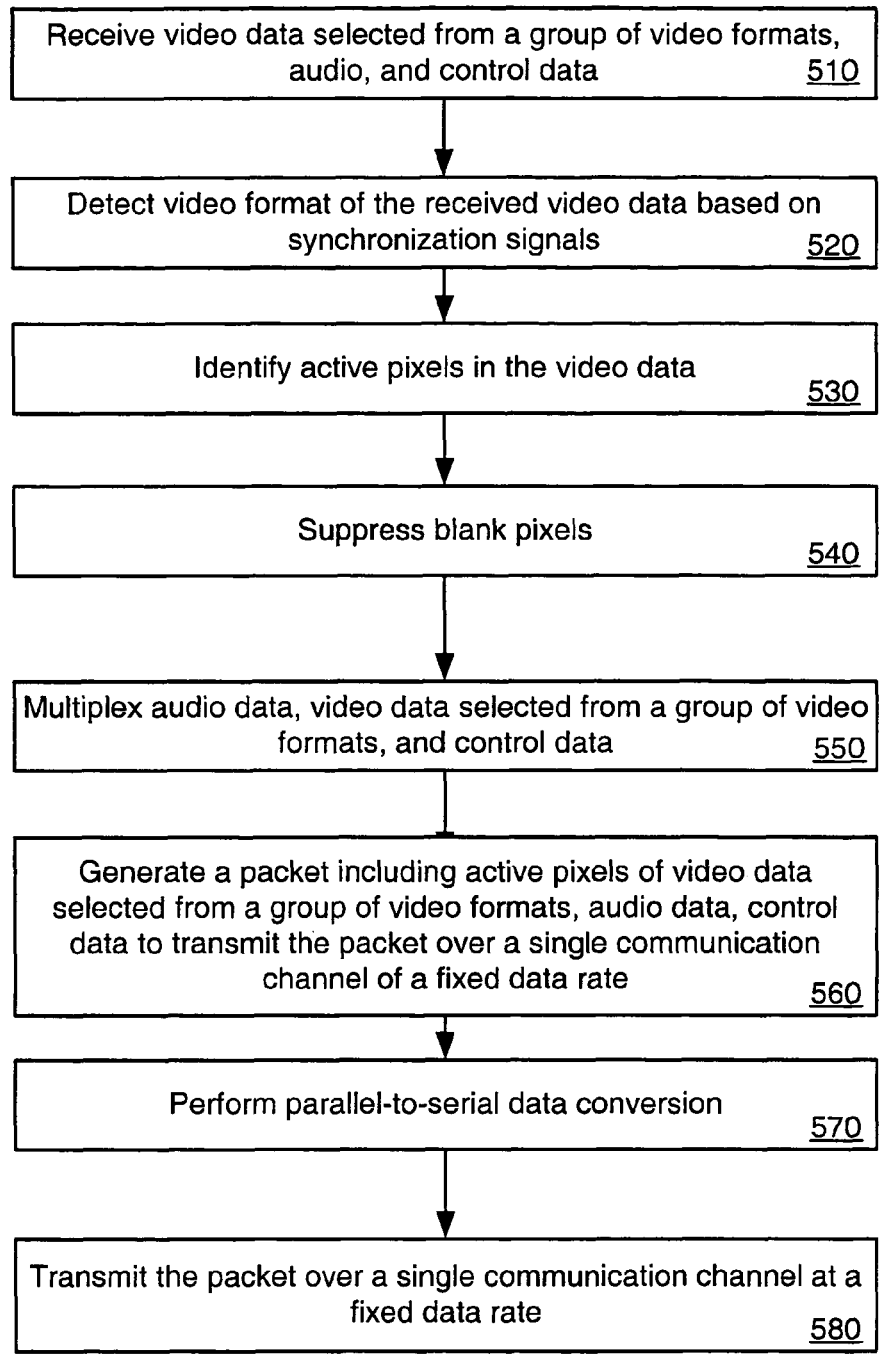
FIG. 5 is a flow chart of a method performed by the transmitter unit shown in FIG. 2.

FIG. 5 is a flow chart of the steps performed by transmission unit 120 to transmit video data selected from a group of various video formats, audio data and control data over a single communication channel 140. In the first step 510, video data 202, audio data 204, control data 206, synchronization signals and a timing signal are received. It should be noted that video data 202 is received at a pixel clock rate specified by the video format of the received video data 202. Similarly, audio data 204 is received at an audio data rate specified by an audio format of the received audio data 204. Unit 120 identifies 520 video format based on synchronization signals. Unit 120 identifies 530 active pixels in the video data using known specifications for each video format. Once active pixels have been identified, unit 120 suppresses 540 blank pixels and outputs active pixels. At step 550 a subset of video data 202 for active pixels, a subset of audio data 204 and a subset of control data 206 are multiplexed. In a preferred embodiment, the subset of video data 202 is one line of video data 202; a subset of audio data 204 is the audio data received over the period of time one line of video data 202 is received by transmitter unit 120; and a subset of control data 206 is four control words.

At step 560, unit 120 builds a data packet 212 that preferably includes one line of active pixels for video data, audio data 204 received over the period of time one line of video data 202 is received, and four control words. Unit 120 adds IDLE characters to the data packet 212 as necessary sufficient to transmit audio data 204 and video data 202 over single communication channel 140 at a fixed data rate. The format of the data packet 212 is flexible as to include video data 202 selected from a group of various video formats and audio data 204.

Unit 120 optionally encrypts the video data 202 and audio data 204 in the data packet 212. At step 570 unit 120 performs parallel-to-serial data conversion as is well-known in the art. For example, unit 120 converts one word of video data 202 using 8 b/10 b encoding scheme, such that it converts each video word from 8 bits to 10 bits. At step 580, unit 120 transmits the data packet 212 over the single communication channel 140 at a fixed data rate without transmitting a PIXEL_CLK signal.

Figure 6:
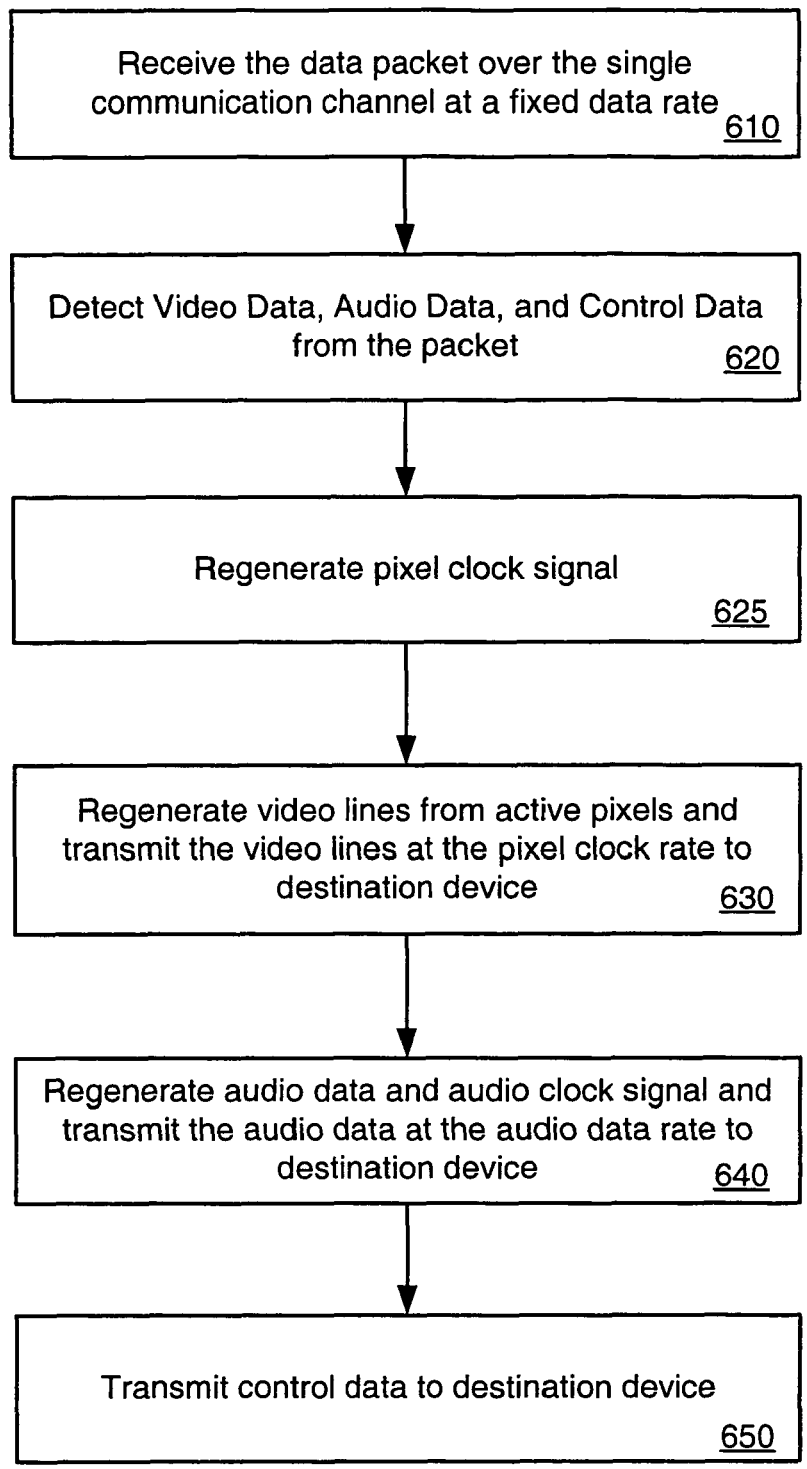
FIG. 6 is a flow chart of a method performed by the receiver unit shown in FIG. 4.

FIG. 6 is a flow diagram of the steps performed by receiver unit 130. Initially, unit 130 receives 610 data packet 212 from unit 120 over serial communication link having one communication channel 140. Unit 130 performs 620 serial-to-parallel conversion of video data as is well-known in the art. Unit 130 then detects and deletes IDLE characters, such as K28.5 characters Optionally, unit 130 decrypts video words 392 and audio words 394.

At step 620, unit 130 identifies video format and the current line number from the data packet 212 and detects video words 392, audio words 394 and control words 390. Unit 130 then regenerates 625 PIXEL_CLK signal for video data using, for example, a PLL or a free running clock method.

Once the PIXEL_CLK signal has been generated, unit 130 regenerates 630 a video frame from active pixel data. Unit 130 also regenerates synchronization signals HSYNC and VSYNC using a video format code and current line number and transmits the regenerated video data 202 to destination unit 160.

At step 640 audio words 394 are converted to an original data format. Unit 130 regenerates an audio data rate at which audio data was received by transmitter unit 120 is regenerated. The converted audio data 204 is outputted at the original audio data rate to destination device 160. At step 650, control words are transmitted to destination device 160.

Thus, the present invention advantageously transmits video data selected from a group of various video formats over a single communication serial link at a fixed data rate without requiring a dedicated channel for a pixel clock signal. In addition, the present invention beneficially suppresses blank data and transmits only active video data, thereby increasing communication bandwidth.

One skilled in the art would understand that any of the steps, operations, or processes described herein can be performed or implemented with one or more software or hardware modules, alone or in combination with other devices, and in the case of hardware with analog or digital circuitry or a combination thereof. It should further be understood that portions of the communication system 100 described in terms of particular hardware elements may be implemented with software, and that software elements may be implemented with hardware, such as hard-coded into a dedicated circuit. In one embodiment, a software module is implemented with a computer program product comprising a computer-readable medium containing computer program code, which can be executed by a computer processor for performing the steps, operations, or processes described herein.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

We claim:

1. A system for transmitting video data over a single, serial communication channel of a fixed data rate, the video data selected from a group of various video formats, wherein at least one format in the group has a different pixel clock rate than the other, the system comprising:

a transmitter unit adapted to receive the video data selected from a group of various video formats, the video data having a first pixel clock rate, to build a data packet including a subset of the video data, and to transmit the data packet over the single, serial communication channel at the fixed data rate, the transmitter unit not transmitting a pixel clock signal including the first pixel clock rate; and a receiver unit adapted to receive the data packet over the single, serial communication channel of the fixed data rate, to process the received data packet and to reconstruct the video data and the first pixel clock rate, and to output the video data at the first pixel clock rate.

2. The system of claim 1, wherein the transmitter unit further comprises:

a video format detector for receiving the video data at the first pixel clock rate, identifying the video format of the received video data, and outputting a video format code of the video data;

a video data formatter for receiving the video data at the first pixel clock rate, the video data having blank data corresponding to blank pixels and active data corresponding to active pixels, identifying a subset of the video data, suppressing the blank data of the subset of the video data, and outputting the active data of the subset of the video data; and a multiplexor for receiving the active data of the subset of the video data, generating a data packet including the active data of the subset of the video data, and transmitting the data packet over the single, serial communication channel at the fixed data rate of the channel.

3. The system of claim 2, wherein the subset of the video data is a line of the video data.

4. The system of claim 2, wherein the multiplexor is further adapted to add data to the data packet as necessary, the added data sufficient to transmit the subset of the received video data over the single, serial communication channel at the fixed data rate.

5. The system of claim 4, wherein the added data comprises at least one IDLE character.

6. The system of claim 2, wherein the transmitter unit is further adapted to transmit audio data having a first audio data rate, and wherein the multiplexor is further adapted to include a subset of the audio data into the data packet to transmit the data packet over the single, serial communication channel.

7. The system of claim 6, wherein the transmitter unit is further adapted to receive control data, and wherein the multiplexor is further adapted to include the control data in the data packet to transmit the control data over the single, serial communication channel.

8. The system of claim 2, further comprising:
a parallel-to-serial converter adapted to receive the data packet and convert the active data of the subset of the video data to serial data.

9. The system of claim 2, further comprising:
a video elastic buffer for receiving the active data of the subset of the video data and storing the subset of the video data.

10. The system of claim 2, further comprising:
an encryption module adapted to receive the data packet and encrypt the active data of the subset of the video data.

11. The system of claim 8, wherein the receiver unit further comprises:
a serial-to-parallel converter adapted to receive the data packet and convert the serial data of the subset of the video data to parallel video data;
a demultiplexor adapted to receive the data packet, identify the subset of the video data, and output the subset of the video data; and
a video frame controller adapted to receive the subset of the video data, re-generate the first pixel rate, re-generate the video data, and output the regenerated video data at the first pixel rate.

12. The system of claim 10, further comprising:
a data decryption module for receiving the data packet including encrypted active data of the subset of the video data and decrypt the video data.

13. The system of claim 11, wherein the transmitter unit is further adapted to transmit audio data having a first audio data rate, and wherein the multiplexor is further adapted to include a subset of the audio data into the data packet to transmit the data packet over the single, serial communication channel and wherein the demultiplexor is further adapted to identify the subset of audio data from the data packet.

14. The system of claim 13, wherein the demultiplexor further comprises:
an audio elastic buffer for storing the identified subset of the audio data;
an audio clock circuit adapted to regenerate a first audio data rate of the subset of the audio data; and
an audio data formatter for receiving the identified subset of the audio data, and outputting the audio data at the first audio data rate.

15. The system of claim 11, wherein the transmitter unit is further adapted to receive control data and transmit a subset of the control data over the single, serial communication channel and wherein the demultiplexor is further adapted to identify the subset of control data.

16. The system of claim 15, wherein the receiver unit further comprises:
a control elastic buffer for storing the identified subset of the control data; and
a control data interface for receiving the identified subset of the control data and outputting the control data to a destination device.

17. A transmitter adapted to transmit received video data having a first pixel clock rate over a single, serial communication channel of a fixed data rate, the video data selected from a group of various video formats, wherein at least one format in the group has a different pixel clock rate than the other, the transmitter comprising:
a video format detector for receiving the video data at the first pixel clock rate, identifying the video format of the received video data, and outputting a video format code of the video data;
a video data formatter for receiving the video data at the first pixel clock rate, the video data having blank data corresponding to blank pixels and active data corresponding to active pixels, for identifying the subset of the video data using the video format code, for suppressing the blank data of the subset of the video data, and for outputting the active data of the subset of the video data; and
a multiplexor for receiving the active data of the subset of the video data, generating a data packet including the active data of the subset of the video data, and transmitting the data packet over the single, serial communication channel at the fixed data rate of the channel, the transmitter not transmitting a pixel clock signal including the first pixel clock rate.

18. The transmitter of claim 17, wherein the video format code further comprises:
a first field for identifying a number of video lines per video frame in the video data;
a second field for identifying a number of pixels per line of the video data; and
a third field for identifying a number of video frames per second.

19. The transmitter of claim 17, wherein the subset of the video data is a line of the video data.

20. The transmitter of claim 17, further adapted to transmit received audio data having a first audio data rate, and wherein the multiplexor is further adapted to include a subset of the audio data into the data packet to transmit the data packet over the single, serial communication channel.

21. The transmitter of claim 20, further comprising:
an audio data formatter adapted to determine a number of audio clock cycles during a period of time the subset of the video data is received and include the number of audio clock cycles into the data packet transmitted over the single, serial communication channel.

22. The transmitter of claim 17, further adapted to receive control data, and wherein the multiplexor is further adapted to include the control data in the data packet to transmit the control data over the single, serial communication channel.

23. The transmitter of claim 17, further comprising:
a parallel-to-serial converter adapted to receive the data packet and convert the active data of the subset of the video data to serial data.

24. The transmitter of claim 17, further comprising:
a video elastic buffer for receiving the active data of the subset of the video data and storing the subset of the video data.

25. The transmitter of claim 17, further comprising:
an encryption module adapted to receive the data packet and encrypt the active data of the subset of the video data.

26. A receiver adapted to receive a data packet from a transmitter over a single, serial communication channel of a fixed data rate, the data packet including video data having a first pixel clock rate, the video data selected from a group of various video formats, wherein at least one format in the group has a different pixel clock rate than the other, the receiver comprising:
a serial-to-parallel converter adapted to receive the data packet over the single, serial communication channel and convert the video data to parallel video data, the transmitter not transmitting a pixel clock signal including the first pixel clock rate to the receiver;
a demultiplexor adapted to receive the data packet, identify the video data in the data packet, and output the identified video data; and
a video frame controller adapted to receive the identified video data, re-generate the first pixel clock rate, re-generate the video data, and output the regenerated video data at the first pixel clock rate.

27. The receiver of claim 26, wherein the data packet includes a video format code comprising a first field for identifying a number of video lines per video frame in the video data; a second field for identifying a number of pixels per line of the video data; and a third field for identifying a number of video frames per second and wherein a video data formatter is adapted to regenerate the video data using number of video lines per video frame in the video data, number of pixels per line of the video data, and a number of video frames per second.

28. The receiver of claim 26, further comprising:
a data decryption module for receiving the data packet including encrypted active data of the video data and decrypt the video data.

29. The receiver of claim 26, wherein the data packet further includes a subset of audio data and a number of audio clock cycles counted during a period of time the subset of the video data is received and wherein the demultiplexor is further adapted to identify the subset of the audio data in the data packet.

30. The receiver of claim 29, further comprising:
an audio elastic buffer for storing the identified subset of the audio data;
an audio clock circuit adapted to receive the number of audio clock cycles and regenerate a first audio data rate of the subset of the audio data using the number of audio clock cycles; and
an audio data formatter for receiving the subset of the audio data and outputting the audio data at the first audio data rate.

* * * * *

UNITED STATES PATENT AND TRADEMARK OFFICE
CERTIFICATE OF CORRECTION

| | | |
|---|---|---|
| PATENT NO. | : 7,792,152 B1 | Page 1 of 1 |
| APPLICATION NO. | : 10/864755 | |
| DATED | : September 7, 2010 | |
| INVENTOR(S) | : Mingcheng Xu et al. | |

It is certified that error appears in the above-identified patent and that said Letters Patent is hereby corrected as shown below:

Column 15, Line 3, replace "claim 2" with --claim 1--.

Signed and Sealed this
First Day of February, 2011

David J. Kappos
*Director of the United States Patent and Trademark Office*